US012684058B1

(12) United States Patent
Alnajjar et al.

(10) Patent No.: US 12,684,058 B1
(45) Date of Patent: Jul. 14, 2026

(54) APPARATUS FOR CONTROLLING A MOBILE DEVICE

(71) Applicant: United Arab Emirates University, Al Ain (AE)

(72) Inventors: Fady Alnajjar, Al Ain (AE); Sara Almarzooqi, Al Ain (AE); Fatima Ali Abdulla Albaity, Al Ain (AE)

(73) Assignee: United Arab Emirates University, Al Ain (AE)

( * ) Notice: Subject to any disclaimer, the term of this patent is extended or adjusted under 35 U.S.C. 154(b) by 0 days.

(21) Appl. No.: 19/212,402

(22) Filed: May 19, 2025

(51) Int. Cl.
    *H04M 1/04*     (2006.01)
    *H04M 1/72409*     (2021.01)
    *H04M 1/72475*     (2021.01)

(52) U.S. Cl.
    CPC ......... *H04M 1/04* (2013.01); *H04M 1/72409* (2021.01); *H04M 1/72475* (2021.01); *H04M 2201/40* (2013.01)

(58) Field of Classification Search
    None
    See application file for complete search history.

(56) References Cited

U.S. PATENT DOCUMENTS 8,660,695 B2   2/2014   De La Rosa Tames et al.
9,208,502 B2   12/2015   Parikh et al.
11,112,216 B1 *   9/2021   Fan ........................ F41G 11/00
(Continued)

FOREIGN PATENT DOCUMENTS

EP     0977172 A1 *   2/2000  ............. G11B 27/34
GB     2543738 A *   5/2017  ...... H04M 1/724092
(Continued)

OTHER PUBLICATIONS

Kozyreva et al. "Public Attitudes Towards Algorithmic Personalization and Use of Personal Data Online: Evidence from Germany, Great Britain, and the US", Center for Adaptive Rationality, Max Planck Institute for Human Development; School of Psychological Science, University of Bristol; University of Western Australia in 12 pages.

(Continued)

*Primary Examiner* — Jinsong Hu
*Assistant Examiner* — Alexander J Yi
(74) *Attorney, Agent, or Firm* — KNOBBE, MARTENS, OLSON & BEAR, LLP

(57)         ABSTRACT

An apparatus 10 for controlling a mobile device 12 includes a mounting base 14 for securely attaching a mobile device 12, a sensing system 18 with a camara 20 for capturing user gestures and a microphone 22 for monitoring user commands and device audio. A carriage assembly 24 incorporates a movable stylus assembly 26 with styluses 28 for interacting with the device's touchscreen 30 through actions like swiping and scrolling. A processing system analyzes visual and auditory signals, actuating the stylus assembly 26 for manipulating the touchscreen 30. The apparatus 10 supports multiple interaction methods, including EEG and EMG signals, enhancing accessibility for users with mobility impairments. The system's AI-driven audio analysis engine detects the end of media playback, prompting automatic scrolling actions, ensuring seamless navigation and personalized user experience across various touchscreen devices.

15 Claims, 7 Drawing Sheets

(56)          References Cited

U.S. PATENT DOCUMENTS

| | | | |
|---|---|---|---|
| 11,977,677 B2 | 5/2024 | Parshionikar | |
| 2013/0313844 A1* | 11/2013 | De La Rosa Tames | .................... B25J 15/0009 901/31 |
| 2021/0195398 A1* | 6/2021 | Baldree | .............. G08B 21/0297 |
| 2021/0326094 A1* | 10/2021 | Buerli | ................. G06F 3/04815 |
| 2022/0229529 A1* | 7/2022 | Rodgers | ................ G06F 3/0485 |

FOREIGN PATENT DOCUMENTS

| | | | | | |
|---|---|---|---|---|---|
| JP | 2018173349 A | * | 11/2018 | | |
| KR | 20170132277 A | * | 12/2017 | ........ | H04M 1/72409 |
| WO | WO-2013148531 A2 | * | 10/2013 | ............. | H04M 1/04 |
| WO | WO 2014019538 A1 | | 2/2014 | | |
| WO | WO-2017051263 A2 | * | 3/2017 | .......... | G06F 11/2221 |

OTHER PUBLICATIONS

Master Ginger In Circuits Robots "Screen Tapping Robot" Autodesk Instructables—in 6 Steps (with Pictures).

* cited by examiner

APPARATUS FOR CONTROLLING A MOBILE DEVICE

FIELD OF INVENTION

This invention relates to an apparatus for controlling a mobile device.

BACKGROUND TO INVENTION

Navigating social media platforms like Instagram™, Tik-Tok™, and YouTube™ often requires manual input, limiting accessibility and convenience. Existing solutions, such as voice commands and gesture controls, struggle with consistency, accuracy, and compatibility, leaving many users underserved.

Navigating social media platforms has become an integral part of modern digital interaction. However, traditional methods of scrolling and swiping require constant manual finger input, limiting accessibility and convenience. Users often struggle to interact with their devices while engaged in activities such as cooking, driving, or multitasking. Additionally, individuals with mobility impairments face significant challenges in navigating touchscreen interfaces, highlighting the need for a more inclusive and effortless solution.

While existing software solutions like voice commands and gesture controls attempt to address these challenges, they often fail to provide consistent performance. Voice recognition struggles in noisy environments, while gesture-based controls are limited in accuracy and range. Moreover, software-based tools are frequently incompatible with certain apps or devices, leaving many users underserved in scenarios where hands-free interaction is essential. Whether cooking, exercising, driving, or multitasking, users often encounter situations where traditional touchscreen inputs are impractical or unsafe. This highlights the critical need for a universal, hardware-integrated solution that ensures seamless and inclusive interaction with touchscreen devices for all users, regardless of their specific circumstances.

In today's digital age, interacting with touchscreen devices has become integral to daily life, from navigating social media platforms like Instagram™, TikTok™, and YouTube™ to multitasking across various applications. Touchscreen technology has revolutionized how we access information, communicate, and engage with content, making it a cornerstone of modern digital interaction (Zhu, Y. 2023; Pascher, et al., 2019). Research shows that adding swiping to mobile websites can increase user enjoyment and intention to use, while swiping interfaces in shopping applications lead to greater cognitive absorption and playfulness compared to scrolling (Dou, et al., 2016; Choi et al., 2016). These interactions are particularly critical for navigating social media platforms, where seamless scrolling and swiping are essential for content consumption.

However, traditional methods of scrolling and swiping in smartphones require constant manual input, limiting accessibility and convenience, especially for individuals with mobility impairments or those engaged in activities where hands-free interaction is essential, such as cooking, driving, or exercising (Orphanides & Nam, 2017; Large et al., 2013). These limitations create significant barriers for users who cannot rely on conventional touch-based inputs, underscoring the need for more inclusive solutions.

Existing solutions, such as voice commands and gesture controls, attempt to address these challenges but often fall short in terms of consistency, accuracy, and compatibility. For instance, while voice recognition technology has been successfully applied to control Android apps and household appliances (Tarneja et al., 2015; Gozali & Suharto, 2019), it struggles in noisy environments or with complex tasks. Similarly, research on enhancing accessibility for visually impaired users through voice commands shows promise (Pandey & Pandey, 2021), but these systems remain limited by their reliance on clear audio input and semantic understanding.

Gesture-based controls, another common accessibility tool, are limited by their range, precision, and compatibility. While studies have explored using smartphones to control robots and wheelchairs through voice, touch, and gesture inputs (Chand & Sowmika, 2023), these systems often require precise calibration and may not work reliably in all scenarios. For instance, Techniques like BackSwipe show promise but remain niche and lack universal applicability (Cui et al., 2021).

Moreover, software-based accessibility tools frequently encounter compatibility issues with certain apps or devices, leaving many users underserved in scenarios where hands-free interaction is essential. Recent advancements in AI and robotics have explored hands-free interaction systems, offering transformative approaches to accessibility. For instance, multimodal interfaces combining voice commands and gesture controls have been developed to enhance social media interaction. Tools like Qooqle integrate speech and gesture recognition for natural information retrieval (Li & Holtzman, 2011), while TapTag simplifies touchscreen navigation for older adults (Pandya & Elglaly, 2018). Similarly, systems for platforms like Google Chrome™, Gmail™, and Facebook™ allow users with motor impairments to navigate through head gestures and voice commands (Mosquera-DeLaCruz et al., 2020). While these innovations address specific user needs, they often remain limited by software compatibility, environmental constraints, or niche applications. For example, voice-based systems struggle in noisy environments, and gesture-based tools require precise calibration, making them unreliable in real-world scenarios. These limitations highlight the need for a universal, hardware-integrated solution that ensures seamless interaction across all devices and conditions. A need exists for a "robotic finger system", which is physical and portable, and which offers a universal, hardware-integrated approach to automating scrolling and swiping actions on touchscreen devices. Furthermore, a need exists for a robotic finger system capable of simulating human touch with precision, to ensure seamless interaction regardless of environmental conditions or physical abilities, thereby setting a new standard for accessibility and usability.

SUMMARY OF INVENTION

According to a first aspect of the invention, there is provided an apparatus for use by a user for controlling a mobile device of the user, the apparatus including:

a mounting base to which the mobile device of the user is mounted in use, the mounting base including mounting means for mounting the mobile device of a user relative to the mounting base;

a sensing system including:

a visual input system for monitoring visual signals received from the user; and an audio input system for monitoring audio signals from the user and for monitoring audio signals received from the mobile device;

a carriage assembly including:

a movable stylus assembly which is movable relative to the base; and a connector assembly for movably and adjustably connecting the mounting base and the stylus assembly to one another, the movable stylus assembly including at least one stylus for engaging and interacting with a touchscreen of the mobile device of the user and for performing and registering one or more of the following actions on the touchscreen of the mobile device of the user: swiping, scrolling, and/or selecting; and a processing system for processing the visual and auditory signals received from the sensing system and for actuating the movable stylus assembly in response thereto.

The connector assembly may include connector adjustment means for adjusting the location of the electrical connector relative to the connector assembly and thereby adjusting the position of the mobile device relative to the movable stylus assembly.

In a particular embodiment, the processing system of the apparatus may be configured for detecting an end of the video clip displayed on the mobile device. More specifically, the processing system may be configured for detecting the end of the video clip based on audio signals received from the audio input system of the apparatus and/or from metadata of the video clip.

In a particular embodiment, the processing system of the apparatus may include an AI-Audio analysis engine configured for monitoring and processing audio signals from the mobile device. In use, when an audio track played on the mobile device stops playing or reaches its natural end, the AI-Audio analysis engine is configured to recognize silence, and/or, completion pattern in the audio signal and trigger the stylus assembly to perform said scrolling action.

In another embodiment, the processing system includes a timer-based detection mechanism for detecting the end of the video clip. More particularly, in the case of the timer-based detection mechanism, the processing system may be configured to receive a user input of a user selected pre-defined timer, based on the user's viewing preferences and/or habits. For example, if a user typically watches 15-second reels, they can configure the system to automatically scroll after this duration, regardless of actual content length of the video clip.

The inventors envisage that the AI-Audio analysis engine and/or the timer based detection mechanism ensures universal compatibility across all apps and platforms without requiring special permissions or API access In a particular embodiment, the movable stylus assembly may include two styluses. More specifically, the movable stylus assembly may include a rotatable stylus supporting shaft, with each stylus of the pair of styluses mounted to the shaft and projecting outwardly from the shaft in a configuration in which each stylus points in opposite directions. As such, the rotatable stylus supporting shaft may be rotatably mounted within a recess formation provided at an underside of the stylus assembly, and in an arrangement wherein rotation of the stylus supporting shaft causes the, or each, stylus of the pair of styluses to be brought into contact with the touchscreen of the mobile device of the user, in use, thereby to create and register one or more gestures on the screen of the mobile device of the user. In uses said one or more gestures may be for swiping, selecting and/or scrolling the touchscreen of the mobile device of the user. The movable stylus assembly may include an electrical motor for powering the rotatable stylus supporting shaft.

In a particular embodiment, the sensing system may be configured for receiving one or more selected from the group comprising: auditory signals and visual signals from the user. More specifically, the auditory input system may be configured for receiving auditory signals including finger snapping, whistling and/or other sounds made by the user. Alternatively, or additionally, the visual input system may be configured for receiving visual signals from the user including, for example, blinking, winking, smiling, head movements, hand gestures, gaze tracking.

The sensing means may include air pressure sensing means for sensing changes in air pressure, for example, when a user blows on the air pressure sensor.

The sensing system may include an electroencephalogram (EEG) input means, and/or an Electromyography (EMG) input means for receiving EEG and EMG signals, respectively.

More specifically, the EEG input means may be configured for receiving electrical brains signals from the user, while the EMG input means may be configured for receiving electrical signals from nerves and muscles of a user. As such, physically challenged individual, for example, those challenged with severe muscular impairment, may beneficially use the apparatus and control the apparatus using EEG and/or EMG signals.

The mounting means of the mounting base may be in the form of an electrical connector for electrically connecting the mobile device of the user to the base, via the electrical connector thereof. More particularly, the electrical connector may be operable for mechanically connecting the mobile device to the mounting base.

More specifically, the electrical connector may be configured to be received within an electrical connector port of the mobile device, such as, for example, the charging port of the mobile device. Thereby to provide for electrical and mechanical connection of the mobile device to the mounting base.

The connector adjustment means may comprise:

an adjustment knob rotatably mounted to the connector assembly;

an input gear which is connected to an adjustment knob; and a geared connector pin having a fixed end fixedly connected to the mounting base, and a geared opposite end for engaging the input gear.

In use, the connector adjustment means provides for displacement of the mounting base relative to the connector assembly when the knob is rotated, in use, thereby to provide for said adjusting of the location of the electrical connector relative to the connector assembly and thereby relative to the movable stylus assembly. As such, the connector adjustment means provides for mounting of mobile devices of different makes and sizes relative to the mounting base, and in an orientation in which a height of the stylus assembly relative to the base, is correctly located such that the stylus is correctly orientated relative to the surface of the touchscreen.

The connector assembly may further include lateral displacement means for displacing the movable stylus assembly relative to the connector in a lateral direction which is perpendicular to the height direction of motion of the connector when displaced by the connector adjustment means. The lateral displacement means may include a pair of parallel rails projecting outwardly from the connector assembly and a pair of parallel channel formations defined within and running along of length of the stylus assembly, and in which the pair of parallel rails are slidingly received in a tight sliding fit. The lateral displacement means may further include a lateral displacement electrical motor and gears driven by the lateral displacement motor for displacing the stylus assembly relative to the pair of rails received in the channel formations of the stylus assembly, for displacing the stylus assembly relative to the connector assembly.

The processing system may include a machine learning algorithm for tracking and learning swiping and/or scrolling behavior of the user. As such, the machine learning algorithm may be configured to control the movable stylus assembly and said at least one stylus, in accordance with the learned behavior and/or habits of the user.

The mounting base may include a power supply port which is connectable to a connector of a power supply for supplying power to the mounting bases and by extension to the apparatus. The power supply port when connected to the power supply may be operable to supply electrical power to one or more of the lateral displacement motor, the motor for powering the rotatable stylus supporting shaft; the EMG input means; the EEG input means; the processing system; the audio input system; the visual input system; and the rotatable stylus supporting shaft.

In a particular embodiment, the power supplied to the power supply port may be used to supply power to the mobile device via the connector of the mounting base, for charging the mobile device while connecting the mobile device to the apparatus.

BRIEF DESCRIPTION OF DRAWINGS

Further features of the invention are described hereinafter by way of a non-limiting example of the invention, with reference to and as illustrated in the accompanying schematic drawings. In the drawings.

DETAILED DESCRIPTION OF THE DRAWINGS

Figure 1:
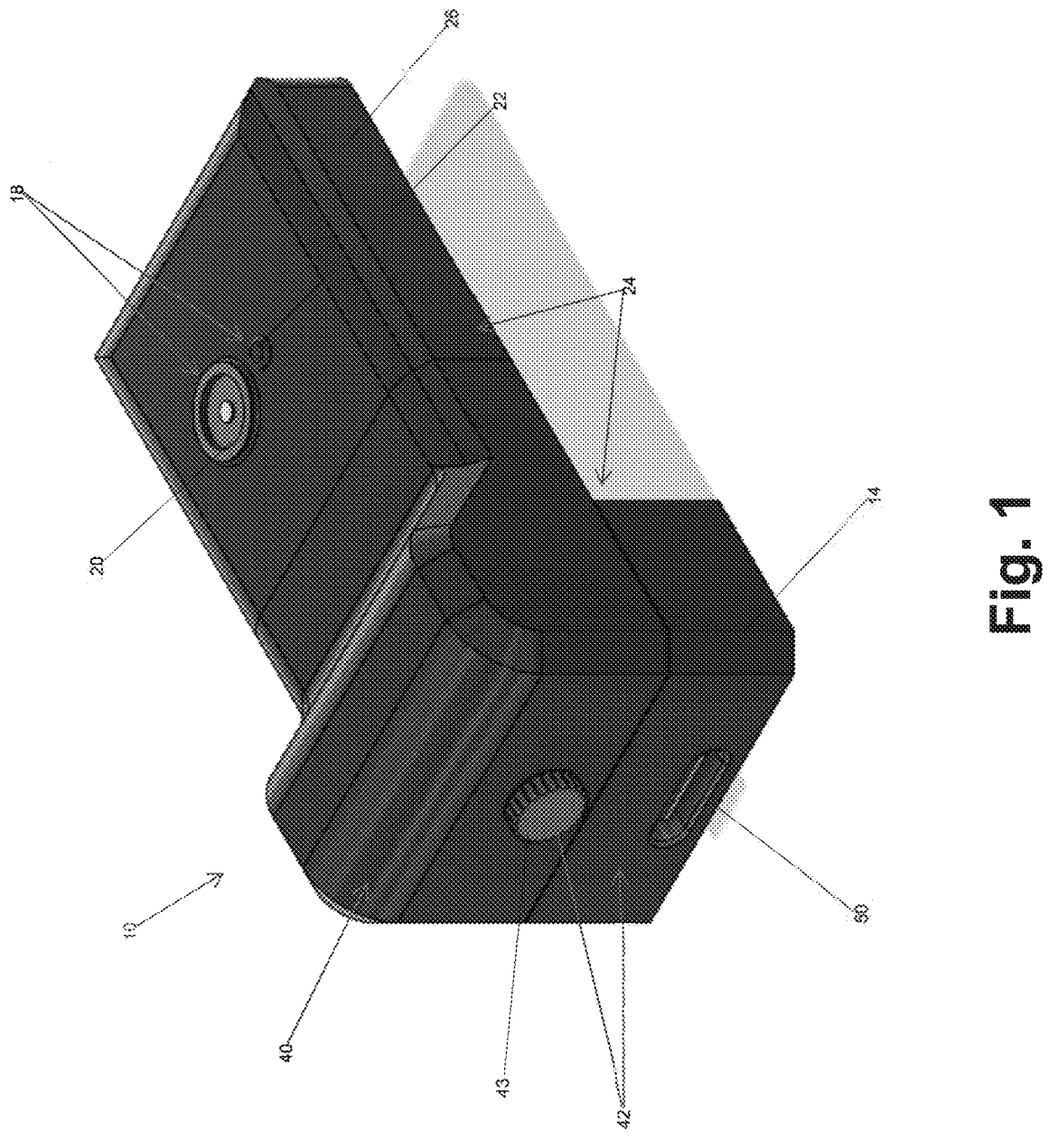
FIG. 1 shows a perspective view of an apparatus in accordance with a first aspect of the invention.
Figures 2A, 2B:
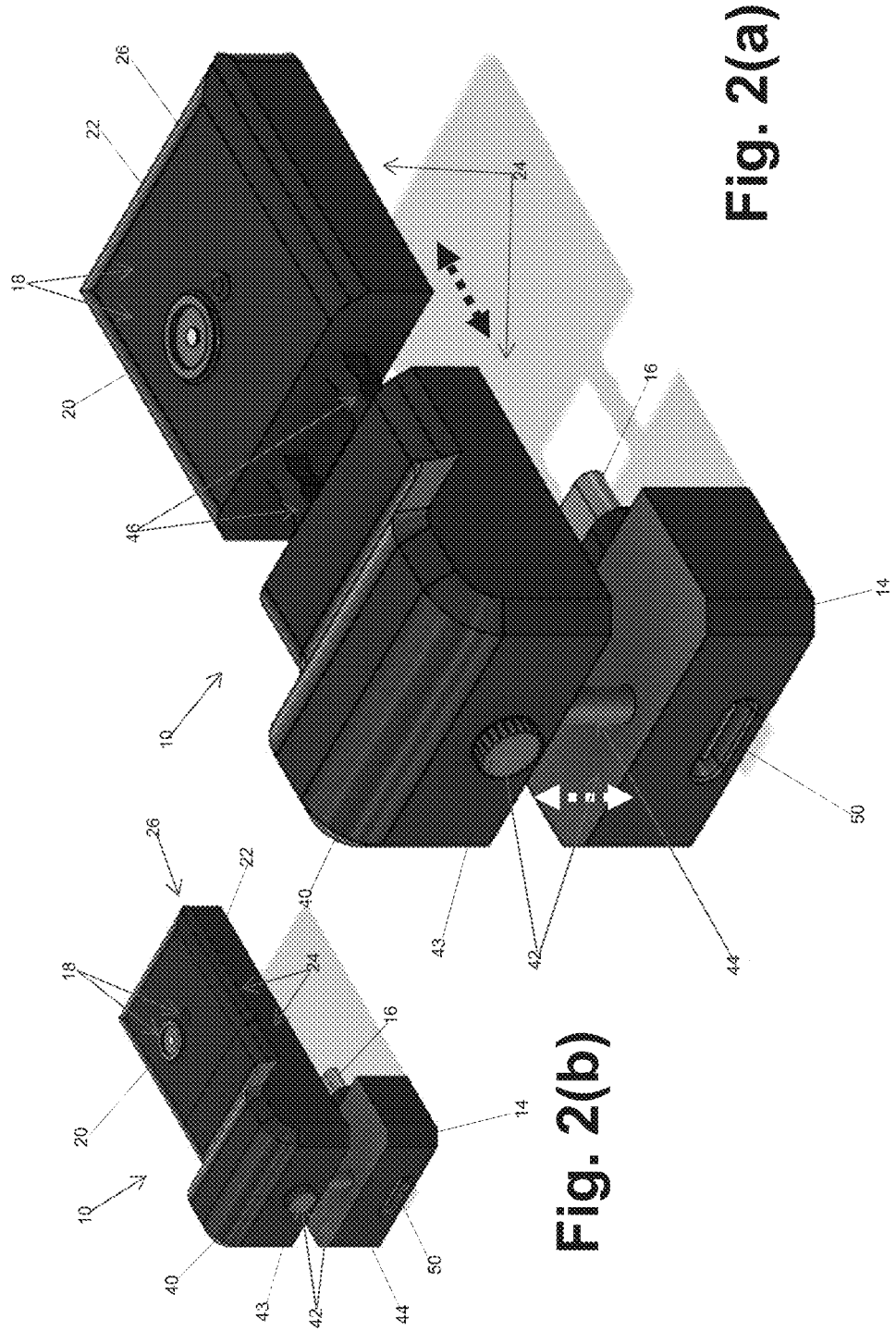
FIG. 2(a) shows the apparatus of FIG. 1 showing displacement of the parts of the apparatus relative to one another.
FIG. 2(b) shows the apparatus of FIG. 1 showing displacement of the parts of the apparatus relative to one another.
Figure 3:
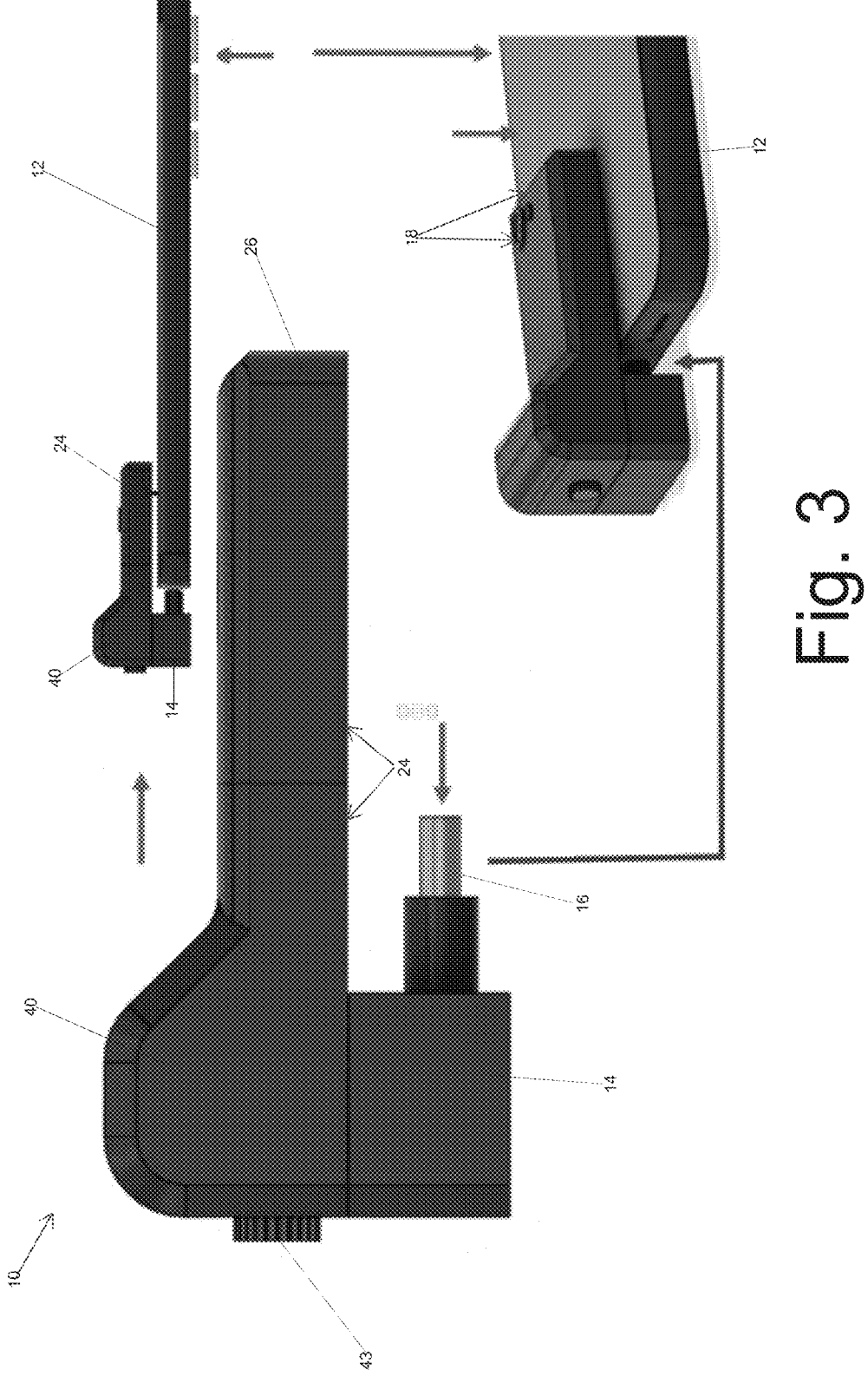
FIG. 3 shows side and perspective partly fragmentary views of the apparatus of FIG. 1 and illustrating the apparatus of FIG. 1 being connected, in use, to a mobile device.

With reference to the drawings, an apparatus in accordance with the invention is designated generally by reference numeral 10 and is configured for use by a user for controlling a mobile device 12.

More specifically, the apparatus 10 provides a comprehensive system that integrates various components to facilitate user interactions with the mobile device 12 through both touch and non-touch methods.

The apparatus 10 includes a mounting base 14 to which the mobile device 12 is mounted, in use, a sensing system 18, a carriage assembly 24, and a processing system.

The mounting base 14 is configured to securely hold the mobile device 12 in place during operation. It includes mounting means in the form of a connector 16, which provides both mechanical and electrical connections between the mobile device 12 and the mounting base 14. This connector 16 is operable to mechanically and electrically connect the mobile device 12 to the mounting base 14 via the electrical connector 16, which is received in the charging port of the mobile device 12, thereby ensuring a reliable physical and electrical connection.

The sensing system 18 is configured to monitor visual signals from the user and auditory signals from the user and from the mobile device 12, as will be explained below. The sensing system 18 comprises a visual input system in the form of a camera 20 for capturing visual signals, such as gestures or facial expressions of the user, and an audio input system in the form of a microphone 22 for monitoring audio signals from the user, including commands and sounds. The microphone 22 also monitors audio signals received from the mobile device 12 for detecting an end of a video clip as will be explained below. In addition to these components, the sensing system 18 further includes air pressure sensing means for sensing changes in air pressure, enabling the user to interact with the apparatus 10 by blowing on the air pressure sensor. The auditory input system is specifically configured to receive auditory signals, including finger snapping, whistling, and other sounds made by the user, allowing for diverse interaction methods, as will be explained in more detail below.

The sensing system 18 also includes an electroencephalogram (EEG) input means and/or an electromyography (EMG) input means for receiving EEG and EMG signals, respectively. The EEG input means is configured to receive electrical brain signals from the user, while the EMG input means is designed to capture electrical signals from the nerves and muscles of the user. These features are particularly beneficial for individuals with severe muscular impairments, allowing them to control the apparatus 10 through EEG and/or EMG signals.

The carriage assembly 24, provides a versatile mounting system, and includes a movable stylus assembly 26 and a connector assembly 40. The carriage assembly 24 is configured to allow for movement of the movable stylus assembly 26 relative to the mounting base 14. More specifically, the carriage assembly 24 allows for the adjustable positioning of the movable stylus assembly 26, which includes at least one stylus 28.

Figure 4:
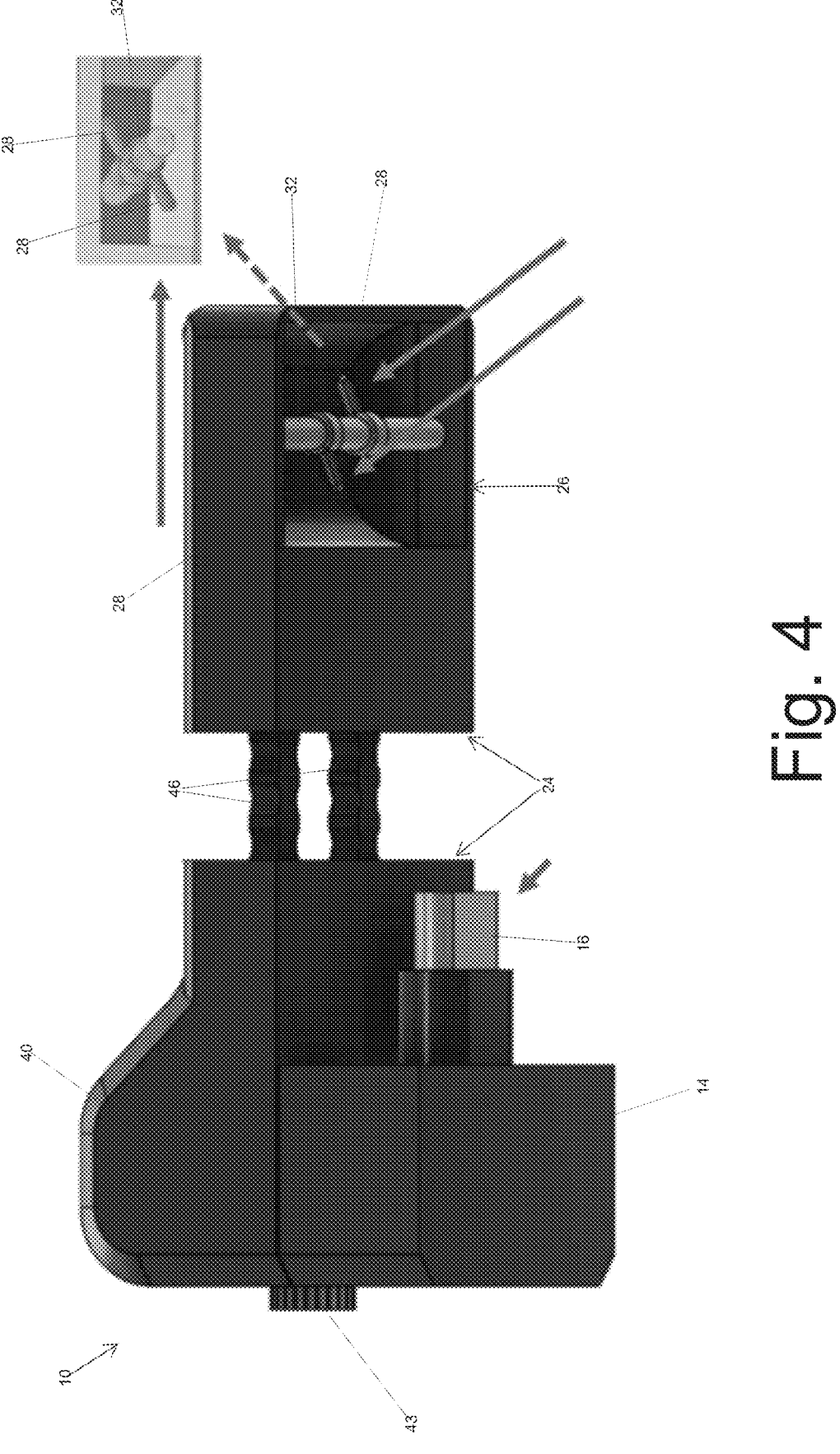
FIG. 4 shows a perspective view of an underside of apparatus of FIG. 1, with details of parts show in in inset view in FIG. 4.
Figure 5:
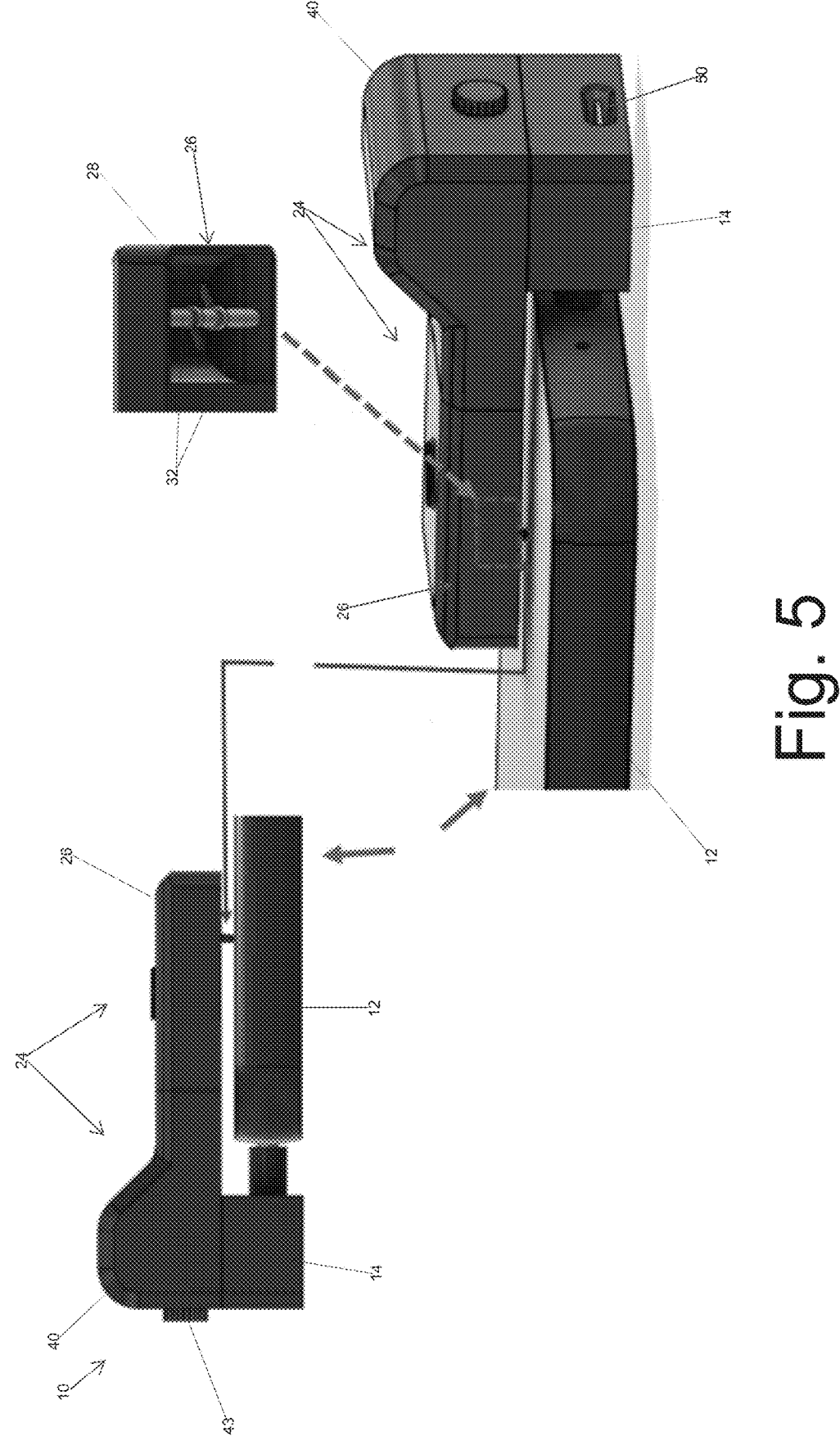
FIG. 5 shows a side view and isometric view of the apparatus of FIG. 1, showing the apparatus connected to a mobile device and shown with details of parts on an underside of the apparatus show in in inset view in FIG. 5.
Figure 6:
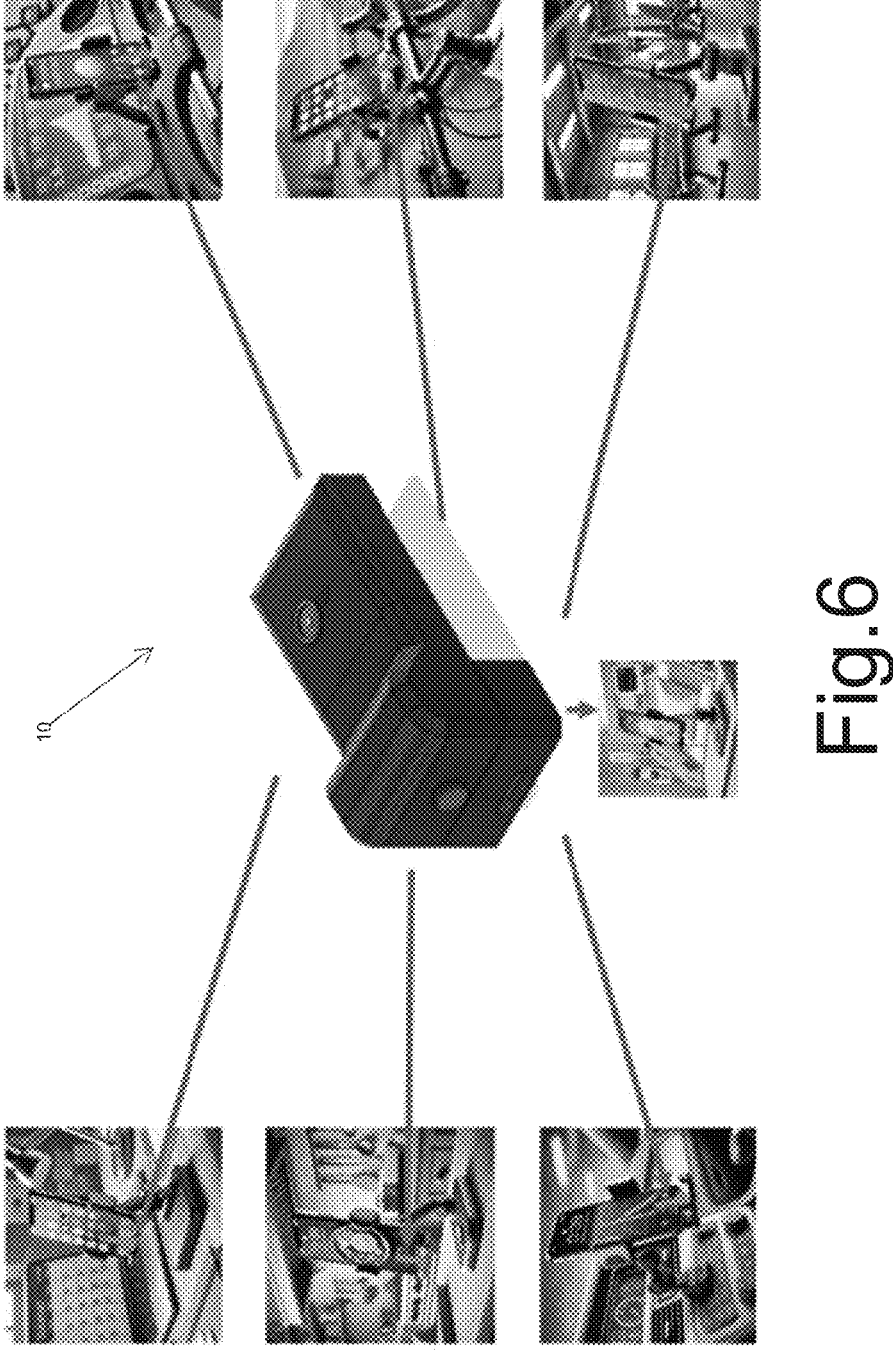
FIG. 6 shows an illustration of various mounting arrangements for mounting the apparatus of FIG. 1 relative to a supporting device for supporting the apparatus in different contexts, such as, as shown clockwise (from approximately 2'o clock) in inset view: mounted to a treadmill, mounted to a road bike, in a gym, on a hospital room table, in a car, on a kitchen counter, and on a desk.

The movable stylus assembly 26 is designed to engage and interact with the touchscreen 30 of the mobile device 12, performing and registering actions such as swiping, scrolling, and selecting. In a particular embodiment, the movable stylus assembly 26 comprises two styluses 28. More specifically, as best illustrated in FIGS. 4 and 5, the movable stylus assembly 26 includes a rotatable stylus supporting shaft 32, with each stylus 28 mounted to the shaft 32 and projecting outwardly in opposite directions.

The rotatable stylus supporting shaft 32 is rotatably mounted within a recess formation provided at the underside of the stylus assembly 26 (see FIG. 4), allowing for the rotation of the shaft 32 to bring the styluses 28 into contact with the touchscreen 30, thereby to create and register one or more gestures on the screen 30 of the mobile device 12 of the user. These gestures may be for swiping, selecting and/or scrolling the touchscreen 30 of the mobile device of the user. The movable stylus assembly 26 includes an electrical motor for powering the rotatable stylus supporting shaft 32.

The connector assembly 40 is configured to provide a movable and adjustable connection between the mounting base 14 and the stylus assembly 26. The connector assembly 40 includes connector adjustment means 42 for adjusting the location of the electrical connector 16 relative to the connector assembly 40, thereby adjusting the position of the mobile device 12 relative to the movable stylus assembly 26. The connector adjustment means 42 comprises an adjustment knob 43 rotatably mounted to the connector assembly 40, an input gear connected to the adjustment knob 43, and a geared connector pin 44 that has a fixed end connected to the mounting base 14 and a geared opposite end for engaging the input gear. When the adjustment knob 43 is rotated, the connector adjustment means 42 displaces the mounting base 14 relative to the connector assembly 40, adjusting the location of the electrical connector 16 and ensuring proper alignment between the stylus assembly 26 and the touchscreen 30 of the mobile device 12.

The connector assembly 40 further includes lateral displacement means for allowing lateral movement of the movable stylus assembly 26 relative to the connector assembly 40. This lateral displacement means consists of a pair of parallel rails 46 (see FIG. 4) that project outwardly from the connector assembly 40, with a corresponding pair of channel formations defined within the stylus assembly 26. The rails 46 are slidingly received in the channel formations, enabling smooth lateral movement. Additionally, the lateral displacement means includes a lateral displacement motor and gears driven by this motor, allowing for controlled lateral displacement of the stylus assembly 26 relative to the connector assembly 40.

The processing system is configured for processing the visual and auditory signals received from the sensing system 18. It actuates the movable stylus assembly 26 in response to these signals, allowing for interactive control of the mobile device 12. In a specific embodiment, the processing system is configured for detecting the end of a video clip displayed on the mobile device 12 based on audio signals received from the audio input system or from metadata associated with the video clip. Furthermore, the processing system includes a machine learning algorithm that tracks and learns the swiping and scrolling behavior of the user, thereby enabling the stylus assembly 26 to operate in accordance with the learned habits and preferences of the user.

The processing system of the apparatus further includes an AI-Audio analysis engine configured for monitoring and processing audio signals from the mobile device and/or a timer-based detection mechanism for detecting the end of the video clip.

In use, when an audio track played on the mobile device stops playing or reaches its natural end, the AI-Audio analysis engine is configured to recognize silence, and/or, completion pattern in the audio signal and trigger the stylus assembly to perform said scrolling action.

In the case of the timer-based detection mechanism, the processing system is configured to receive a user input of a user selected predefined timer, based on the user's viewing preferences and/or habits. For example, if a user typically watches 15-second reels, they can configure the system to automatically scroll after this duration, regardless of actual content length of the video clip.

The inventors envisage that the AI-Audio analysis engine and/or the time-based detection mechanism ensures universal compatibility across all apps and platforms without requiring special permissions or API access. The inventors envisage that the AI-Audio analysis engine and/or the timer-based detection mechanism ensures universal compatibility across all apps and platforms without requiring special permissions or API access The apparatus 10 also includes a power supply port 50 that is connectable to a power supply, enabling the apparatus to receive electrical power. When connected, the power supply port 50 is operable to supply power to various components, including the lateral displacement motor, the motor for powering the rotatable stylus supporting shaft 32, the EMG input means, the EEG input means, the processing system, the audio input system, and the visual input system. Furthermore, the power supplied to the power supply port 50 is also used to charge the mobile device 12 via the connector 16 while it is connected to the apparatus 10.

Use of the Apparatus 10

The apparatus 10 offers a universal, hardware-integrated approach to automating scrolling and swiping actions on touchscreen devices. By simulating human touch with precision through the movable stylus assembly 26, this system ensures seamless interaction regardless of environmental conditions or physical abilities, setting a new standard for accessibility and usability. The movable stylus assembly 26 is equipped with motorized, replaceable stylus pen tips capable of clockwise and counter-clockwise rotation, enabling seamless swiping and scrolling on capacitive and resistive touchscreens.

The connector assembly 40 of the apparatus 10 provides an adjustable mounting mechanism with motorized height control, allowing precise alignment with various smartphone and tablet screen sizes and thicknesses for optimal performance.

The processing system of the apparatus 10 is equipped with a default AI-driven audio analysis engine that detects when a video or audio clip has ended by analyzing metadata and acoustic signals. This triggers the movable stylus assembly 26 to perform precise swipes or scrolls, ensuring seamless navigation without requiring constant user engagement. In addition to this core functionality, the system supports multiple interaction methods, including sound-based inputs, facial gestures, head movements, and even neural signals for users with mobility impairments. Advanced signal processing ensures reliability across all touchscreen devices, while intelligent error-handling prevents unintended activations. By continuously learning and adapting to user behavior, the processing system personalizes scrolling behavior based on user preferences and content consumption patterns, ensuring a tailored and intuitive browsing experience.

In summary, the apparatus 10 provides an innovative and versatile solution for controlling a mobile device 12 through a combination of mechanical, visual, auditory, and neurological inputs. Its design incorporates numerous adjustable components and advanced technologies to accommodate a wide range of user needs and preferences.

Figure 7:
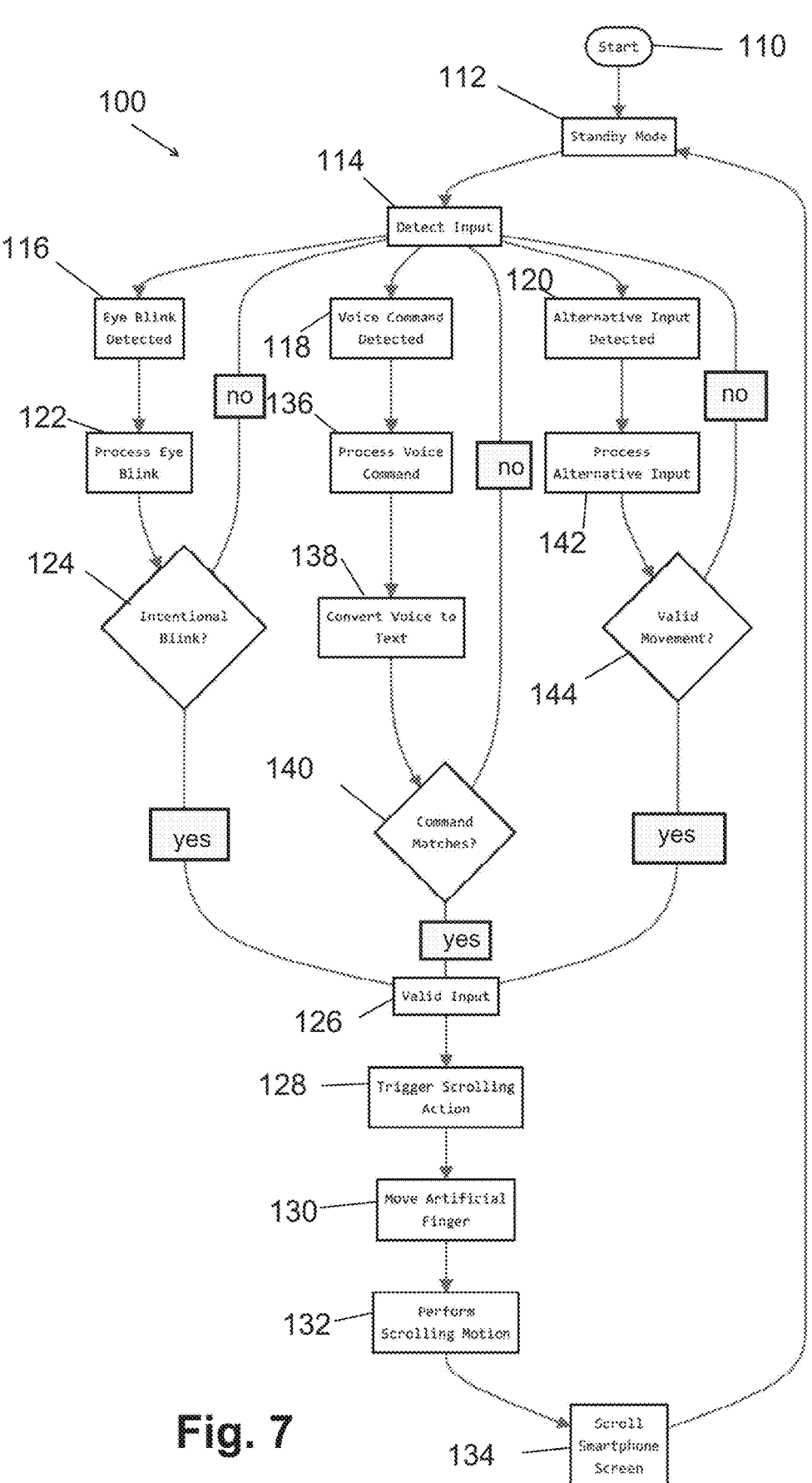
FIG. 7 shows a flowchart showing an overview of the operation of the apparatus of FIG. 1, in use.

FIG. 7 shows the apparatus 10, in use, and illustrates some of the functionality thereof. Referring to FIG. 7, a flowchart showing the operation of the apparatus 10 is indicated generally by reference numeral 100.

The operation begins when the apparatus 10 is powered up, to start the apparatus 10 as indicated by reference numeral 110. When started, the apparatus 10 is in standby mode, as indicated by reference numeral 112. When in standby mode 112, the apparatus 10 is configured to detect inputs, as indicated by reference numeral 114. More specifically, various inputs trigger scrolling actions, such as eye blink detected 116, voice command detected 118, or alternative input detected 120.

If an eye blink is detected 116, the processing system processes the eyeblink 122, to determine if it is intentional or unintentional 124. If the processing system determines the eyeblink to be unintentional, the apparatus 10 returns to detecting inputs 114. Alternatively, if the processing system determines the eyeblink to be intentional, then it constitutes a valid input 126, and the processing system triggers scrolling 128, by controlling the movable stylus assembly 26 for moving the activating 130 the two styluses 28 for performing the scrolling motion 132 and scrolling the smartphone screen 134, and thereafter return the apparatus 10 to standby mode 112.

If a voice command is detected 118, the processing system processes the voice command 136 and converts the voice command into text 138. The processing system then analyzes the text from the voice command, 140. If the text of the voice command matches standard allowed commands known to the processing system, it constitutes a valid input 126.

If an alternative input is detected 120, such as, for example, one of the multiple movement, input signals mentioned above, the processing system processes the alternative input 142 and determines if it is a valid movement/signal 144. If it constitutes a valid signal or movement, it constitutes a valid input 126, alternatively, the apparatus 10 continues to detect inputs 114.

ADVANTAGES OF INVENTION

The apparatus 10 offers several key advantages over existing technologies, particularly in terms of accessibility, versatility, and reliability. Unlike software-based solutions that are often limited by app or device compatibility, the apparatus 10 is a hardware-based solution that works with all touchscreen devices, ensuring seamless interaction regardless of operating system or specific app restrictions. The apparatus 10 supports a wide range of multi-modal interaction methods, making it highly inclusive for users with mobility impairments. The AI-powered automation engine of the processing system detects when a video or audio track has ended and automatically triggers swipes or scrolls, personalizing interactions by learning user preferences over time.

The apparatus 10 empowers individuals with mobility impairments, supports safer multitasking, and aligns with the global trend toward smarter, more inclusive technologies. This innovation not only redefines hands-free interaction but also paves the way for a more accessible and equitable digital future by unlocking the full potential of touchscreen devices, the apparatus 10 provides an intelligent, adaptable solution for the next generation of smart device users.

This specification has been described with reference to embodiments of the invention. However, one of ordinary skill in the art appreciates that various modifications and changes can be made without departing from the scope of the invention as set forth in the claims below. Accordingly, the specification is to be regarded in an illustrative rather than a restrictive sense, and all such modifications are intended to be included within the scope of invention.

The invention claimed is:

1. An apparatus for use by a user for controlling a mobile device of the user, the apparatus comprising:
a mounting base to which the mobile device of the user is mounted in use, the mounting base including mounting means for mounting the mobile device of a user relative to the mounting base;
a sensing system including:
a visual input system for monitoring visual signals received from the user; and
an audio input system for monitoring audio signals from the user and for monitoring audio signals received from the mobile device;
a carriage assembly including:
a movable stylus assembly which is movable relative to the base, and
a connector assembly for movably and adjustably connecting the mounting base and the stylus assembly to one another,
the movable stylus assembly including at least one stylus for engaging and interacting with a touchscreen of the mobile device of the user and for performing and registering one or more of the following actions on the touchscreen of the mobile device of the user: swiping, scrolling, and/or selecting; and
a processing system for processing the visual and auditory signals received from the sensing system and for actuating the movable stylus assembly in response thereto;
wherein the mounting means of the mounting base is in the form of an electrical connector for electrically connecting the mobile device of the user to the base, via the electrical connector;
wherein the electrical connector is configured to be received within an electrical connector port of the mobile device, such as the charging port of the mobile device;
whereby the electrical connector provides for both electrical and mechanical connection of the mobile device to the mounting base;
wherein the connector assembly further includes a connector adjustment means for adjusting the location of the electrical connector relative to the connector assembly; and
wherein the connector adjustment means comprises:
an adjustment knob rotatably mounted to the connector assembly;
an input gear that is connected to the adjustment knob; and
a geared connector pin having a fixed end fixedly connected to the mounting base, and a geared opposite end for engaging the input gear.

2. The apparatus as claimed in claim 1, wherein the movable stylus assembly includes two styluses.

3. The apparatus as claimed in claim 2, wherein the movable stylus assembly includes a rotatable stylus supporting shaft, with each stylus of the pair of styluses mounted to the shaft and projecting outwardly from the shaft in a configuration in which each stylus points in opposite directions.

4. The apparatus as claimed in claim 3, wherein the rotatable stylus supporting shaft is rotatably mounted within a recess formation provided at an underside of the stylus assembly, such that rotation of the stylus supporting shaft causes each, stylus of the pair of styluses to be brought into contact with the touchscreen of the mobile device of the user, in use.

5. The apparatus as claimed in claim 4, wherein the rotation of the stylus supporting shaft allows the styluses to create and register one or more gestures on the screen of the mobile device of the user, said one or more gestures including swiping, selecting, and/or scrolling the touchscreen of the mobile device of the user.

6. The apparatus as claimed in claim 5, wherein the movable stylus assembly includes an electrical motor for powering the rotatable stylus supporting shaft.

7. The apparatus as claimed in claim 1, wherein the processing system is configured for detecting an end of a video clip displayed on the mobile device based on audio signals received from the audio input system of the apparatus and/or from metadata of the video clip.

8. The apparatus as claimed in claim 1, wherein the sensing system is configured for receiving auditory signals including finger snapping, whistling, or other sounds made by the user.

9. The apparatus as claimed in claim 1, wherein the sensing system includes an electroencephalogram (EEG) input means for receiving electrical brain signals from the user.

10. The apparatus as claimed in claim 1, wherein the sensing system includes an electromyography (EMG) input means for receiving electrical signals from nerves and muscles of the user.

11. The apparatus as claimed in claim 1, wherein the connector assembly includes lateral displacement means for displacing the movable stylus assembly relative to the connector in a lateral direction which is perpendicular to the height direction of motion of the connector when displaced by the connector adjustment means.

12. The apparatus as claimed in claim 11, wherein the lateral displacement means includes a pair of parallel rails projecting outwardly from the connector assembly.

13. The apparatus as claimed in claim 12, wherein the lateral displacement means further includes a lateral displacement electrical motor for displacing the stylus assembly relative to the connector assembly.

14. The apparatus as claimed in claim 1, wherein the processing system includes a machine learning algorithm for tracking and learning swiping and/or scrolling behavior of the user.

15. The apparatus as claimed in claim 1, wherein the mounting base includes a power supply port which is connectable to a connector of a power supply for supplying power to the mounting base and to the apparatus.

* * * * *